United States Patent [19]

Mallory

[11] 4,100,937
[45] Jul. 18, 1978

[54] VALVE BLOCK
[75] Inventor: James D. Mallory, Maumee, Ohio
[73] Assignee: Owens-Illinois, Inc., Toledo, Ohio
[21] Appl. No.: 714,878
[22] Filed: Aug. 16, 1976
[51] Int. Cl.² .................................... F16K 11/10
[52] U.S. Cl. ........................ 137/596.16; 91/443; 137/881
[58] Field of Search .............. 65/172, 173, DIG. 13; 91/443; 137/269, 269.5, 271, 454.5, 454.6, 596.1, 596.16, 596.2, 608

[56] References Cited

U.S. PATENT DOCUMENTS

| 2,700,986 | 2/1955 | Gunn | 137/596.16 |
| 3,244,193 | 4/1966 | Loveless | 137/454.6 |
| 3,589,387 | 6/1971 | Raymond | 137/271 |
| 3,918,489 | 11/1975 | Foster | 137/608 X |
| 4,007,028 | 2/1977 | Bublitz | 65/DIG. 13 |

Primary Examiner—Robert G. Nilson
Attorney, Agent, or Firm—D. T. Innis; Myron E. Click; David H. Wilson

[57] ABSTRACT

A compact valve block for an IS glass forming machine in which a plurality of vertically positioned poppet valves which are in two rows and in staggered array, are controlled by solenoid operated pilot valves of equal number to the poppet valves. An air manifold communicates with all of the poppet valves and the air is selectively delivered to the "kiss block" of an IS machine to provide the functional operation of various mechanisms on the machine. The deenergization of the solenoid operated pilot valve associated with any of the poppet valves permits the poppet valve to return under spring pressure to connect its output passage to an exhaust passage. All the exhaust passages on all of the poppet valves enter a common header which in turn communicates with an exhaust chamber, thus muffling the sound of air normally associated with the exhaust of the pneumatic motors of an IS machine.

16 Claims, 6 Drawing Figures

VALVE BLOCK

BACKGROUND OF THE INVENTION

This invention relates to the valve blocks, incorporating a set of pneumatic valves, for the control of the operations of a Hartford IS type glassware forming machine. Conventional IS forming machines comprise one or more individual sections, each of which is supplied with one, two or more gobs of molten glass, which gobs are formed into bottles or other glassware by mechanisms that are primarily pneumatically operated. Each part of the manipulative mechanism of the section carries out a separate step in the formation of the finished ware from glass gobs and is controlled by the operation of a pneumatic valve. The present IS machines will have as many as twenty-one separate poppet valves, all of which are necessary to control the complete forming cycle. Each valve is normally operated by a separate lever and latch system and each lever and latch system is controlled by an adjustable cam carried by a rotating timing drum. All of the cams are normally housed together on a timing drum which is mounted in a space whose width is about twenty-one inches, this being the widest dimension of the IS machine. Recently, a development of electronic controls for an IS glassware forming machine has necessitated the operation of pneumatic valves under the control of an electrical impulse responsive device. Such a device takes the form of a solenoid operated pilot valve whose operation will control the delivery of an air impulse to the machine operated poppet valves which in turn control the machine air supply to the various pneumatic motors on this machine section. One such valve block of recent design is shown in U.S. Pat. No. 3,918,489 issued Nov. 11, 1975. The present invention is considered an improved device and system for operating an IS machine.

The conventional IS machine has a generally rectangular valve block interface surface in a vertical plane, with a plurality of holes formed therein with each hole being connected to the various operating motors of the forming machine. These holes and connections will be carrying air under pressure to the motors and also exhaust air from the motors upon the proper sequencing of the operators. For example, a motor will close the molds and another motor will open the molds, operating in opposition to each other. Control of an operating function with regard to its velocity may be by throttling of ingoing air under pressure or by the throttling of exhausting air from the opposing motor. These functions are not explained in detail in this application; however, they are fully explained in U.S. Pat. No. 1,911,119.

This rectangular valve block with its vertical wall is termed a "kiss block" and reference thereto in this application will be made as the air supply entrance to the forming machine, as well as the return exhausts from the machine motors.

SUMMARY OF THE INVENTION

A valve block for an individual section glassware forming machine in which a first casting having a plurality of generally vertically positioned poppet valves arranged in two adjacent rows, has a plurality of solenoid operated pilot valves which are connected to a supply of pilot air and control the operation of the poppet valves. A supply of operating air is in a manifold chamber which extends the length of said first casting in overlying relationship to the poppet valves with a plurality of passages extending from the poppet valves through a second casting are adapted to communicate with the "kiss block" of an IS machine. An exhaust header, also extending the length of said first casting, is at a position just below the row of openings in said first casting and control of exhaust air entering the header is provided by the poppet valves.

BRIEF DESCRIPTION OF THE DRAWINGS

FIG. 6 is a cross-sectional view, on an enlarged scale, of one of the poppet valves incorporated in the apparatus.

DETAILED DESCRIPTION OF THE DRAWINGS

Figure 1:
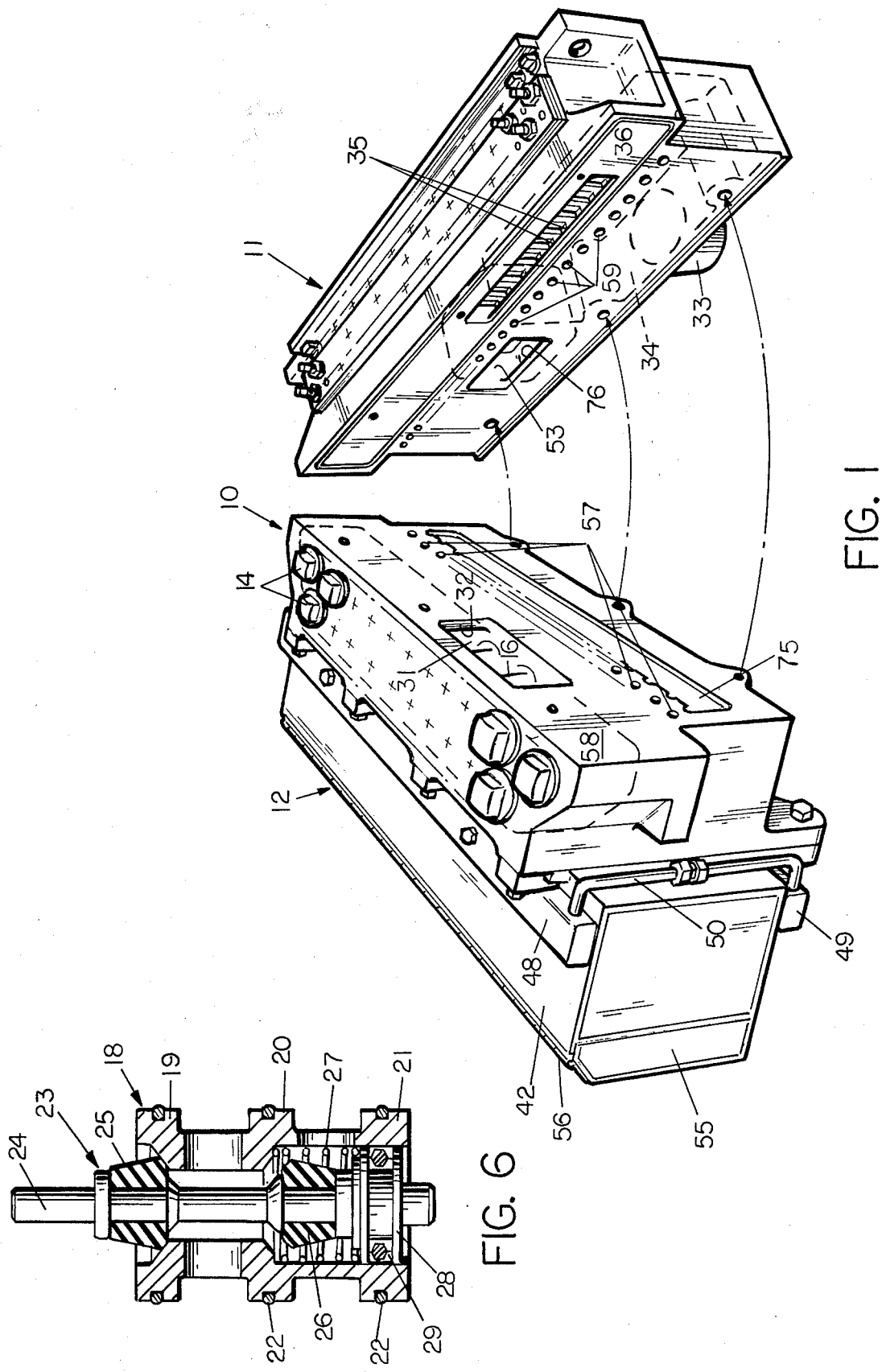
FIG. 1 is a perspective view of the apparatus of the invention with the two main castings swung apart from their normally assembled position.

With particular reference to FIG. 1, the general configuration of the apparatus of the invention takes the form of a first casting 10 which is generally rectangular in configuration and which is adapted to be bolted to a second casting generally designated 11. It should be understood that the casting 11 in turn is intended to be bolted to the "kiss block" of the IS machine.

The casting 10 has a housing 12 bolted to the front face thereof and, as will be explained later, the housing 12 contains much of the electrical interfacing equipment for the valve block of the invention. The first casting 10 has a plurality of vertical passages 13 drilled therethrough with the ends of the passages being closed by threaded caps 14 at the top and caps 15 at the bottom. Within the upper end of the passages 13, there are provided sleeves 16 (see FIGS. 3 and 4). These sleeves are retained by a central stub 17 of the end caps 14. The sleeves extend approximately half-way through the first casting and the lower end of the sleeves bear against a poppet valve housing 18. The poppet valve housing, as shown in detail in FIG. 6, is in the form of three spaced annular ring members 19, 20 and 21. Each of these annular members is provided with an O-ring 22 and when assembled in the opening 13 in the casting 10, isolate the two intermediate areas of the poppet valve, in that the member 19 and its O-ring 22 seals the poppet valve housing relative to the passage 13, as does the member 20 and its O-ring 22 separate the two intermediate areas of the poppet valve and the lower member 21 and its O-ring 22 seals the lower end of the passage 13.

Within the housing 18 is positioned a pneumatically actuatable poppet valve 23 in the form of a vertical shaft 24 with a pair of sealing rings 25 and 26 and is spring-loaded in a downward direction by a spring 27. As shown in detail in FIG. 6, the valve 23 has its sealing ring 25 seated in the annular member 19, while the sealing ring 26 is spaced beneath its seat in the member 20. It should also be noted that the lower end of the shaft 24 incorporates a piston member 28 having a sealing ring 29. The upper end of the shaft 24 of the poppet valve may be guided by an inwardly extending spider 30 supported by the sleeve 13. It should be pointed out that the spider 30 is provided with a plurality of openings through which air may pass with relative freedom.

Figure 3:
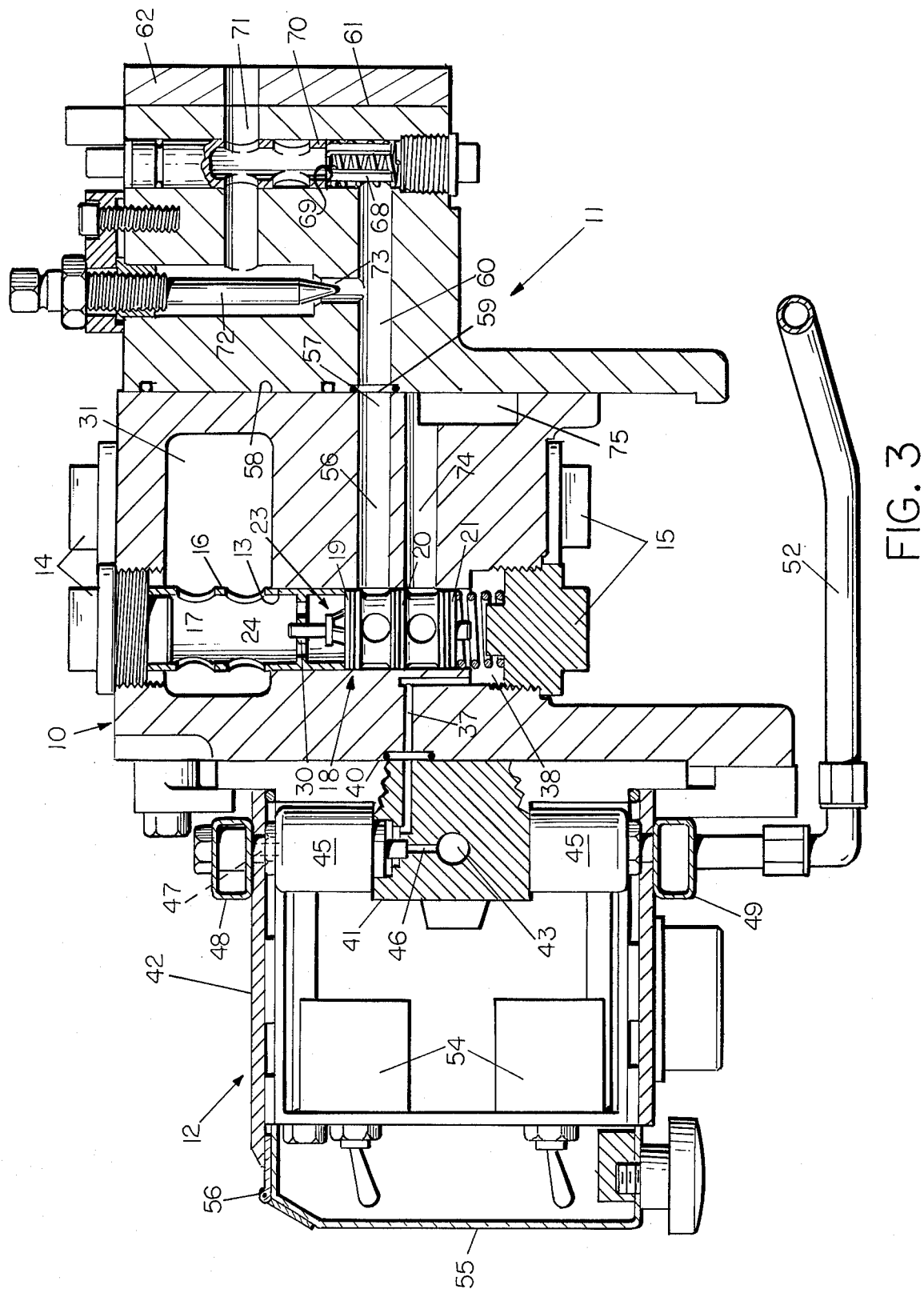
FIG. 3 is a cross-sectional view taken at line 3—3 of FIG. 2 on an enlarged scale.
Figure 4:
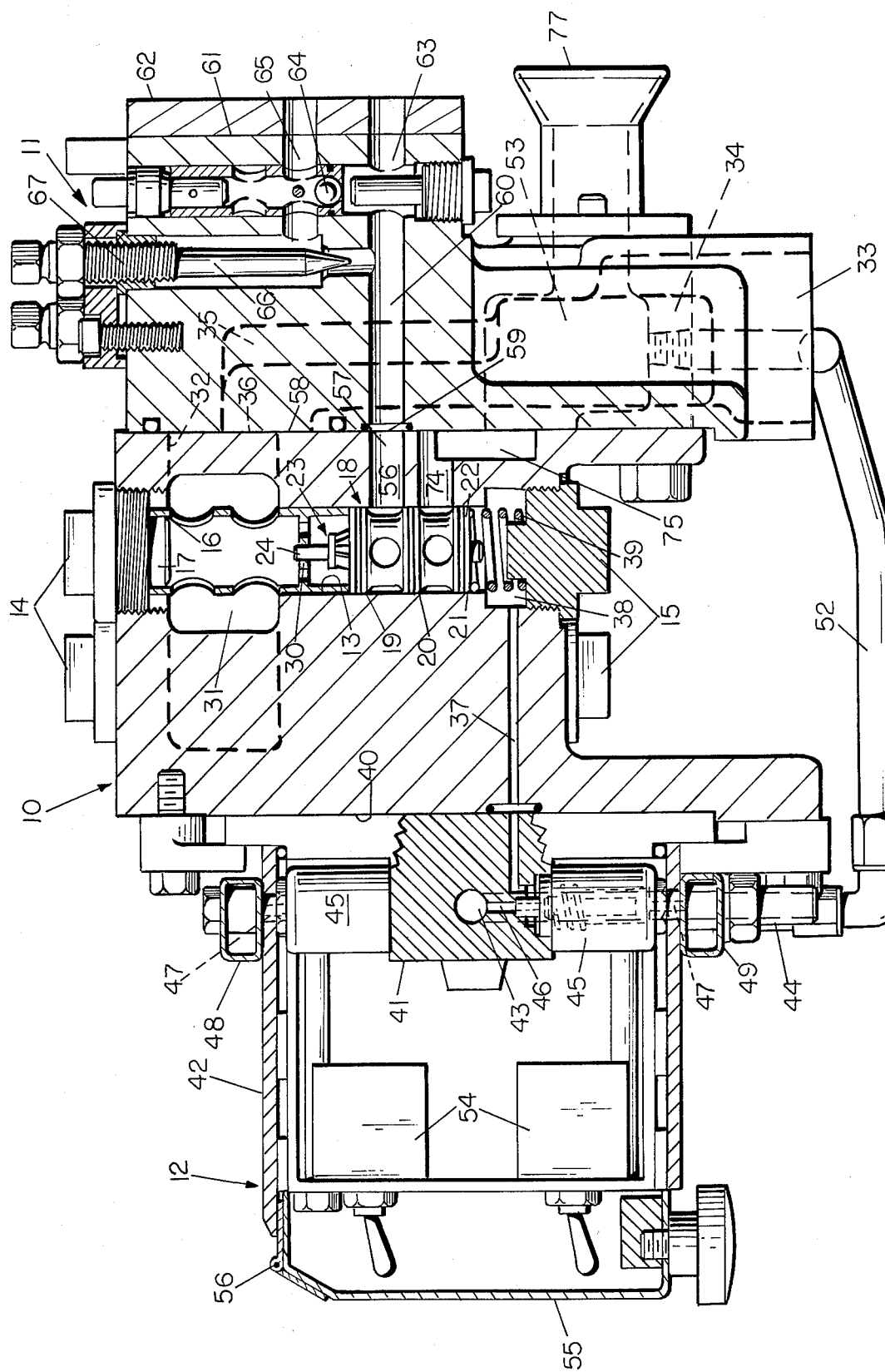
FIG. 4 is a cross-sectional view taken at line 4—4 of FIG. 2 on an enlarged scale.

As can best be seen in FIGS. 3 and 4, the sleeves 13 are also perforated and at the perforated areas are spanning an operating air supply manifold 31. The manifold 31 extends throughout substantially the entire length of the casting 10 and overlies both rows of poppet valves 23. Air to the manifold 31 is supplied through an opening 32, as best seen in FIG. 1. The opening 32 is in the wall of the casting 10 which faces the casting 11. The air enters casting 11 through an inlet header 33 extending vertically downward from the casting 11 and into a generally horizontal chamber 34 in the lower half of the casting 11. The chamber 34 has an elongated, vertically extending, passageway 35 which communicates with an elongated opening 36 in the face of the casting 11 which is in facing relationship to a portion of the opening 32 in the casting 10. In this manner operating air under pressure will find its way to the manifold 31 and into overlying relationship with respect to all of the twenty-one poppet valves 23. The poppet valves 23 are actuated in a preselected sequence determined by the glass forming cycle of the forming machine.

Each poppet valve has a horizontal passageway 37 extending to an annular area 38 at the lower ends of the poppet valves. As can best be seen in FIGS. 3 and 4, the housings 18 of the poppet valves 23 are maintained in their mounted position shown in the drawings by coil compression springs 39. The springs 39 seat on the upper faces of the caps 15 and bias the housings 18 vertically and, therefore, are held against the sleeves 16 in the assembled position shown in FIGS. 3 and 4. As can readily be appreciated, the introduction of air under pressure in the passageways 37 will lift the stem 24 of the poppet valves 23 since this air under pressure will act against the lower piston member 28.

Figure 5:
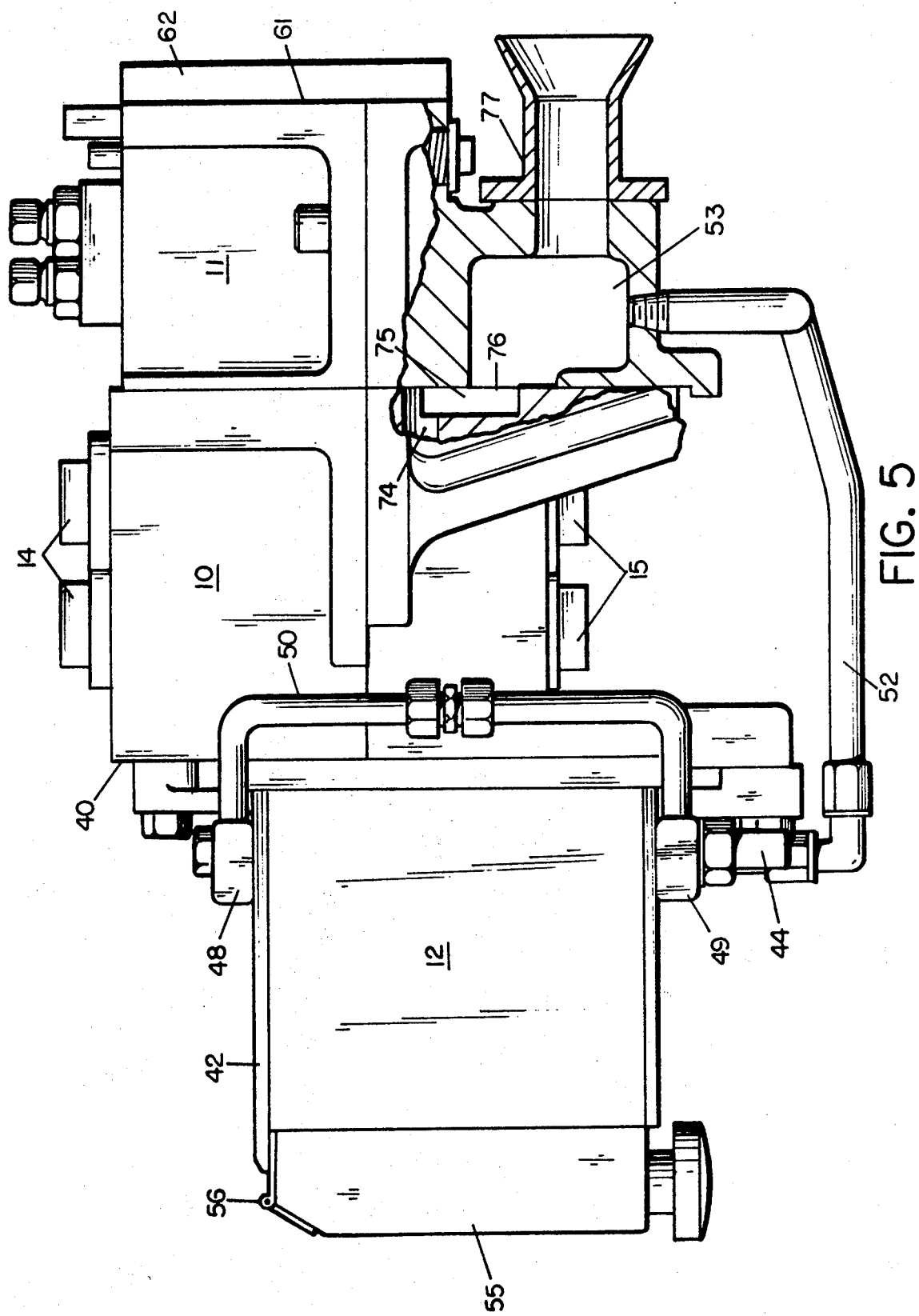
FIG. 5 is a partial cross-sectional view taken at line 5—5 of FIG. 2 on an enlarged scale.

Each of the passageways 37 extend to an opening in a left-hand face 40 of the casting 10. Bolted to the face 40 of the casting 10 is a pilot air manifold 41 which extends nearly the full length of the casting 10. The manifold 41 is enclosed within a housing 42. The manifold comprises a horizontally extending air passage 43. Pilot air under pressure is supplied to the passage 43 through a vertically extending inlet pipe 44, as best shown in FIG. 5. The manifold 41 also serves as a support for a plurality of solenoid operated pilot valves 45. Each of the solenoid valves 45 is a commercially available item and generally takes the form of a solenoid coil surrounding a spring-biased valve member in which the spring returns the valve to its seat, with the operation of the solenoid moving the valve plunger from its seat.

As can best be seen in FIGS. 3-5, the air under pressure in the passage 43 is connected to a plurality of side passages 46 which in turn contain the valve seats. Upon actuation of the solenoid, the valve plunger is lifted and permits air under pressure to enter the passageways 37 which lead to the lower ends of the poppet valves 23. When the solenoids for the pilot valves 45 are deactivated, air which is beneath the poppet valve piston 28 will be forced back through the passage 37 and through the solenoid valve housing to exit through an exhaust port 47. The two rows of solenoid valves 45 are mounted such that their exhaust ports will be in alignment and communicate with a pair of exhaust manifolds 48 and 49.

Figure 2:
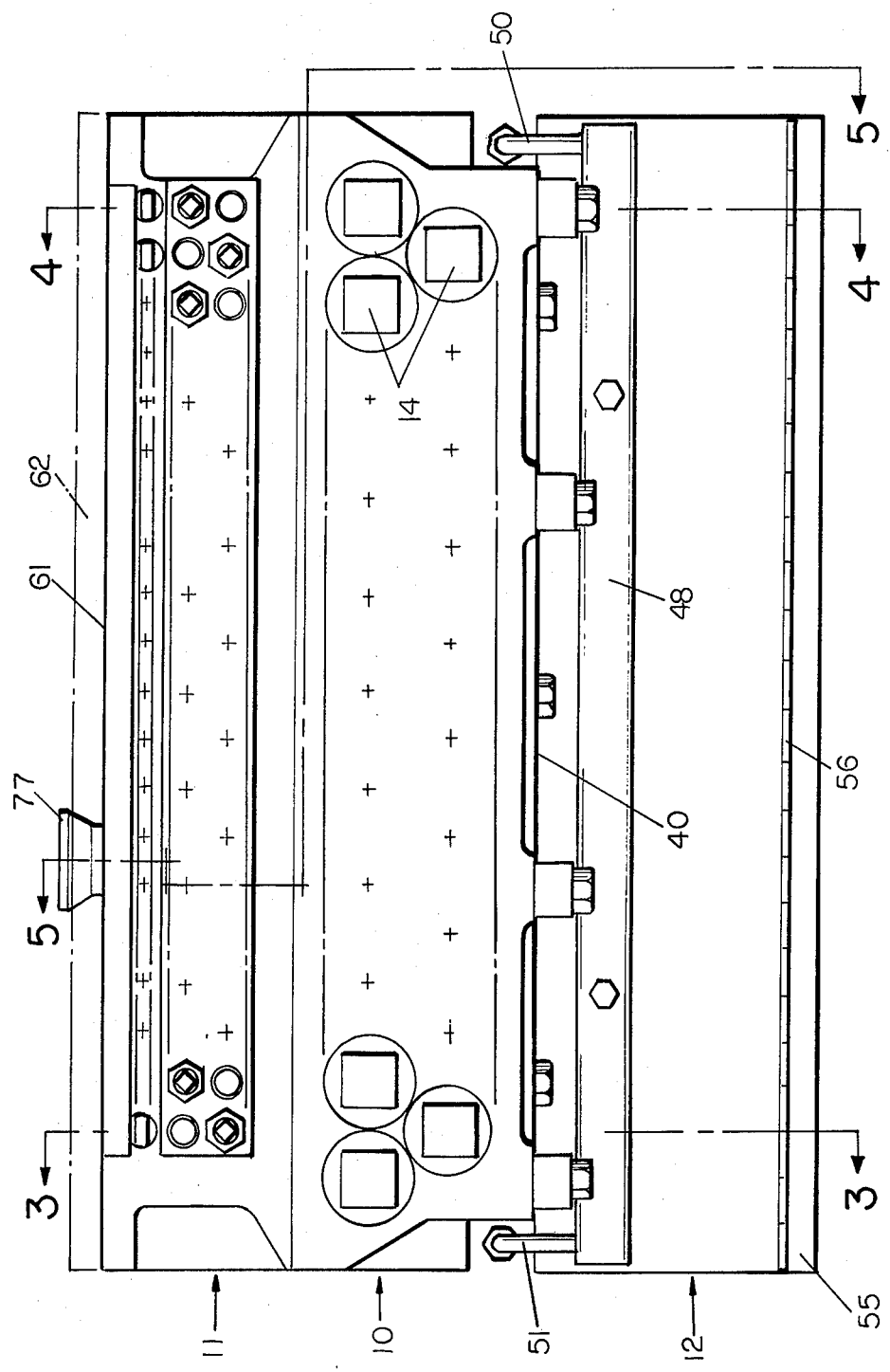
FIG. 2 is a top plan view of the apparatus of FIG. 1 in its assembled position.

As can be seen in FIGS. 1 and 2, these exhaust manifolds 48 and 49 are connected together at one end thereof by a pipe 50 and also at the other end by a pipe 51. In this manner the exhaust air from the pilot valves is collected in the lower manifold 49 and, as best seen in FIGS. 3 and 4, a pipe 52 is connected to the manifold 49 and this pipe 52 extends from the manifold 49 to an exhaust manifold 53 formed in the casting 11.

In normal operation, each of the solenoid valves 45 is operated under the control of a master timer (not shown). As a safety over-ride, each of the individual solenoid valves 45 may be operated by hand through operation of one of a series of toggle switches 54. The toggle switches 54 are positioned within the housing 42 with a cover 55 hinged at 56 to a forward face of the housing 42 which may be opened to provide access to the toggle switches. Thus it can be seen that through the sequential operation of the solenoid valves 45, the poppet valves 23 may be actuated in any desired and proper sequence.

For each of the poppet valves 23 there is a horizontal passage 56 which extends therefrom to the right, as viewed in FIGS. 3 and 4, and forms a row of openings 57 in a right-hand face 58 of the casting 10. The openings 57 match up with openings 59 in the casting 11 when the two castings are bolted together. The openings 59 in the casting 11 are the entrance ports for a plurality of generally horizontal passageways 60. These passageways 60 extend through the casting 11 either directly or by way of branch or off-set channels to open on a face 61 of the casting 11. This face 61, when the invention is in its operational environment on a forming machine, is bolted to a "kiss block" 62 of an IS glassware forming machine. As previously stated, the "kiss block" of an IS machine is where essentially all of the operating air enters and/or exits from the motors which operate the various functions of the forming machine. As previously stated, the air which enters through the "kiss block" may be rate controlled on its entrance or on its exit. For example, as is specifically shown in FIG. 4, operation of the poppet valves 23 will permit air that is within the manifold 31 to pass into the passage 56 thence into the passage 60 in the casting 11 and proceed straight ahead through a continuation 63 of the passage 60. Simultaneously, air flow within the passage 60 will lift a ball check valve 64 and let air under pressure pass through a passage 65 into the "kiss block". Some air may pass by a needle valve 66. However, under normal circumstances, the ball check valve 64 will unseat and this provides a less restrictive passage than that which contains the needle valve 66. In effect, with the configuration of the mechanism of FIG. 4, the air under pressure will enter the "kiss block" through the passages 63 and 65 relatively unchecked with regard to velocity. Upon the return of air from the "kiss block", the ball check valve 64 will seat and the air will be throttled by the needle valve 66. As can readily be seen, the needle valve 66 is adjustable by reason of it being threaded at 67 in the casting 11.

Turning now specifically to FIG. 3, there is shown a spring-biased check valve 68 having its upper face 69 held against the lower end of a sleeve 70, effectively preventing the movement of air from the passage 60 to an outlet opening 71 thereabove, which is in communication with the "kiss block". A needle valve 72 will control the rate of flow of air from the passage 60 since the air must now pass through a branch passage 73 and past the needle valve 72 in order to reach the outlet opening 71. Thus it can be seen that in this situation, shown in FIG. 3, the air under pressure is controlled or throttled on its way to the "kiss block".

The second or lower chamber of the poppet valves 23 is in communication with a passage 74. It should be understood that all of the poppet valves will have a passage 74 which serves as an exhaust passage communicating individually with the lower chambers thereof. These passages 74 all open into an elongated exhaust header 75 formed as a groove in the face 58 of the casting 10. As can best be seen in FIG. 1, this header 75 extends substantially the full length of the casting 10 and in turn aligns with, and is in communication with, an exhaust opening 76 in the casting 11. The exhaust opening 76 in turn communicates with the exhaust manifold 53 formed in the casting 11. The exhaust manifold 53 in turn communicates with an exhaust outlet member 77. When the poppet valves 23 are deactivated, they are returned to the position shown specifically in FIG. 6, at which time the air under pressure in the manifold 31 will be cut off by seating of the ring 25 and air within the passages 60 and 56 will pass by the ring 26 to the passages 74 and the exhaust header 75. Thus the rate of flow of air exhausting from the "kiss block" is controllable. Obviously, the air returning from the "kiss block" through the continuation 63 will pass uninterrupted into the exhaust system.

In the section shown in FIG. 3, air returning from the "kiss block" through the outlet opening 71 will not have to pass the needle valve 72, but will now open the check valve 68 against the light spring force and the air may readily exhaust through the passages 60 and 56 to passages 74 and exhaust header 75.

With the above described apparatus, it can be seen that the control of the functions of a glassware forming machine may be accomplished with the use of a compact valving system. Further, the valving system is of a design which is relatively immune to the hazards which are present where changes and settings were previously required to be done by an operator with a wrench.

The "electrical" valve block has many obvious advantages, with perhaps the most obvious advantage being the capability of being easily interfaced with a computer that will control the interdependent functions of the various mechanisms on the forming machine.

I claim:

1. A valve block for an individual section glassware forming machine comprising:
   a first casting having a plurality of generally vertically positioned poppet valves, said poppet valves being arranged in two adjacent rows;
   individual pilot air inlet passages extending from one wall of said casting to each of said plurality of poppet valves;
   a second casting having a pilot air manifold extending parallel to said one wall;
   a plurality of passages from said manifold communicating with the pilot air passages;
   a plurality of solenoid operated valves carried by said second casting for connecting and disconnecting said supply of pilot air to said plurality of passages from said manifold;
   a third casting connected to the opposite wall of said first casting;
   a plurality of openings in said third casting communicating with a plurality of openings in said first casting;
   a supply of operating air in said first casting in a manifold chamber extending the length of said first casting;
   a plurality of passages extending through said third casting adapted to communicate with the "kiss block" of an IS machine;
   an exhaust header extending the length of said first casting; and
   an exhaust manifold in said third casting having an opening in the wall thereof in communication with said exhaust header.

2. The valve block of claim 1 further comprising check valves and throttle valves in selected passages in said third casting for controlling the rate of flow of exhaust air from the "kiss block" back into the third casting.

3. The valve block of claim 1 further comprising throttle valves in selected passages in said third casting for controlling the rate of flow of air from the third casting into the "kiss block".

4. The valve block of claim 1 wherein said pilot valves are arranged in two rows and further including at least one exhaust manifold extending the length of said second casting in communication with the exhaust from one row of said pilot valves.

5. The valve block of claim 4 further including a second exhaust manifold extending the length of said second casting in communication with the other row of pilot valves and means interconnecting said manifolds.

6. The valve block of claim 5 further including means connecting said pilot valve exhaust manifolds to the manifold in said third casting.

7. A valve block for an individual section glassware forming machine comprising:
   a first elongated casting having a plurality of vertical passages therethrough;
   a poppet valve positioned in each vertical passage;
   a plurality of solenoid operated pilot valves connected to a supply of pilot air, said pilot valves controlling the operation of the poppet valves;
   an operating air supply manifold chamber extending the length of and within said first casting in overlying relationship to the poppet valves;
   a plurality of passages extending from the poppet valves to one face of said first casting;
   a second elongated casting adapted to communicate with the "kiss block" of an IS machine;
   a plurality of passages extending through said second casting;
   means connecting said second casting to said one face of said first casting with the passages in mutual alignment;
   an exhaust header extending the length of said first casting and communicating with exhaust passages from the poppet valves; and
   means controlling the exhaust air entering the header.

8. The valve block of claim 7 further comprising check valves and throttle valves in selected passages in said second casting for controlling the rate of flow of exhaust air from the "kiss block" back into the second casting.

9. The valve block of claim 7 further comprising throttle valves in selected passages in said second casting for controlling the rate of flow of air from the second casting into the "kiss block".

10. The valve block of claim 7 wherein said pilot valves are arranged in two rows and further including at least one exhaust manifold extending the length of one row of said pilot valves and in communication with the exhaust from said one row of said pilot valves.

11. The valve block of claim 10 further including a second exhaust manifold extending the length of the other row of said pilot valves and in communication with the other row of pilot valves and means interconnecting said manifolds.

12. The valve block of claim 11 further including a machine air exhaust manifold connected to said exhaust header and means connecting said pilot valve exhaust manifolds to the machine air exhaust manifold for exhausting together.

13. A valve block for an individual section glassware forming machine comprising:
- a first, generally rectangular casting having a plurality of vertically positioned poppet valves contained therein, said poppet valves being arranged in two adjacent, offset rows;
- pilot air inlet passages extending from one face of said first casting to each of said plurality of poppet valves;
- a horizontal pilot air manifold extending parallel to said one face and fastened thereto;
- a plurality of passages extending from said manifold;
- a plurality of solenoid operated valves mounted to said manifold for connecting and disconnecting the passages from the manifold to said plurality of pilot air passages in said first casting;
- a second casting fastened to the opposite face of said first casting;
- an operating air supply manifold chamber in said first casting and extending the length of said first casting, said manifold chamber communicating with the upper end of said plurality of poppet valves;
- a row of operating air outlet passages in said first casting extending from said poppet valves and controlled thereby;
- a second plurality of passages extending through said second casting and in communication with said air outlet passages in said first casting;
- fluid flow control means in said second casting interposed said passages therein with said passages adapted to communicate with the "kiss block" of an IS machine;
- an exhaust header formed in the opposite face of and extending the length of said first casting at a position just below the row of air outlet passages in said first casting; and
- an exhaust manifold chamber in said second casting having an opening in the wall thereof in communication with said exhaust header.

14. The valve block of claim 13 wherein said pilot valves are arranged in two rows and further including at least one exhaust manifold extending the length of said second casting in communication with the exhaust from one row of said pilot valves.

15. The valve block of claim 14 further including a second exhaust manifold extending the length of said second casting in communication with the other row of pilot valves and means interconnecting said manifolds.

16. The valve block of claim 15 further including means connecting one of said pilot valve exhaust manifolds to the machine air exhaust manifold chamber for exhausting together.

* * * * *